United States Patent
Takaki

(10) Patent No.: US 10,174,719 B2
(45) Date of Patent: Jan. 8, 2019

(54) CONTROL DEVICE FOR INTERNAL COMBUSTION ENGINE

(71) Applicant: NISSAN MOTOR CO., LTD., Yokohama-shi, Kanagawa (JP)

(72) Inventor: Daisuke Takaki, Yokohama (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/417,571

(22) PCT Filed: May 31, 2013

(86) PCT No.: PCT/JP2013/065234
§ 371 (c)(1),
(2) Date: Jan. 27, 2015

(87) PCT Pub. No.: WO2014/020982
PCT Pub. Date: Feb. 6, 2014

(65) Prior Publication Data
US 2015/0211447 A1    Jul. 30, 2015

(30) Foreign Application Priority Data

Aug. 1, 2012  (JP) ................. 2012-171296

(51) Int. Cl.
*F02M 26/06*    (2016.01)
*F02M 26/10*    (2016.01)
(Continued)

(52) U.S. Cl.
CPC ....... *F02M 25/0712* (2013.01); *F02D 41/005* (2013.01); *F02D 41/0055* (2013.01);
(Continued)

(58) Field of Classification Search
CPC ....... Y02T 10/47; Y02T 10/144; Y02T 10/46; F02M 25/0712; F02M 25/0709;
(Continued)

(56) References Cited

U.S. PATENT DOCUMENTS 5,203,311 A * 4/1993 Hitomi ................. F02D 41/005
                                                        123/559.1
6,116,083 A * 9/2000 Cullen ................ F02D 41/0072
                                                        73/114.69
(Continued)

FOREIGN PATENT DOCUMENTS

EP      1 422 409 A1    5/2004
EP      1422409 A1 *    5/2004    ............... F01N 3/02
(Continued)

*Primary Examiner* — Jason Shanske
*Assistant Examiner* — Jessica Kebea
(74) *Attorney, Agent, or Firm* — Drinker Biddle & Reath LLP

(57) ABSTRACT

In a non-EGR region that is a light load operating region, an EGR control valve (21) is opened at a predetermined infinitesimal opening degree M that corresponds to such infinitesimal EGR ratio as not to affect an ignition timing. With this control, since an EGR passage (20) is basically in a state in which the EGR passage (20) is filled with EGR gas, when an operating condition is changed from the non-EGR region to an EGR region and the EGR control valve (21) is opened so as to gain a target EGR ratio, a desired quantity of the EGR gas is introduced into an intake passage (2) substantially at the same time as the opening of the EGR control valve (21). An actual EGR ratio can thus follow the target EGR ratio with a good response.

5 Claims, 3 Drawing Sheets

(51) Int. Cl.
  *F02M 26/23* (2016.01)
  *F02M 26/50* (2016.01)
  *F02D 41/00* (2006.01)
  *F02D 41/12* (2006.01)
  *F02M 25/07* (2006.01)
  *F02M 26/15* (2016.01)

(52) U.S. Cl.
  CPC ..... *F02D 41/0065* (2013.01); *F02D 41/0077* (2013.01); *F02D 41/123* (2013.01); *F02D 41/126* (2013.01); *F02M 26/06* (2016.02); *F02M 26/10* (2016.02); *F02D 41/0072* (2013.01); *F02M 26/15* (2016.02); *F02M 26/23* (2016.02); *F02M 26/50* (2016.02); *Y02T 10/47* (2013.01)

(58) Field of Classification Search
  CPC ........... F02M 25/0713; F02M 25/0701; F02M 25/0718; F02M 25/0727; F02M 26/15; F02M 26/06; F02M 26/10; F02M 26/23; F02M 26/50; F02D 41/0065; F02D 41/0077; F02D 41/123; F02D 41/126; F02D 41/0055; F02D 41/005; F02D 41/0072
  USPC ....................................... 60/605.2
  See application file for complete search history.

(56) References Cited

U.S. PATENT DOCUMENTS

| | | | | |
|---|---|---|---|---|
| 2003/0136390 A1* | 7/2003 | Ramamurthy | ........ | F02D 41/005 123/568.22 |
| 2007/0012030 A1* | 1/2007 | Shirakawa | ............. | F01N 3/021 60/285 |
| 2007/0039598 A1* | 2/2007 | Wakayama | ......... | F02D 41/0027 123/568.21 |
| 2010/0076635 A1* | 3/2010 | Sugimoto | .............. | B60K 6/445 701/22 |
| 2010/0186726 A1* | 7/2010 | Takagi | ................ | F02D 41/0055 123/568.16 |
| 2010/0250103 A1* | 9/2010 | Shimo | ................ | F02D 41/0065 701/108 |
| 2011/0139133 A1* | 6/2011 | Surnilla | ................. | F02M 26/47 123/568.12 |
| 2011/0168143 A1* | 7/2011 | VanDerWege | ...... | F02D 41/0007 123/568.15 |
| 2012/0090584 A1* | 4/2012 | Jung | ................... | F02D 41/0065 123/568.12 |
| 2013/0186074 A1* | 7/2013 | Kanba | ................... | F01N 3/2033 60/286 |
| 2013/0206118 A1* | 8/2013 | Yoshikawa | ......... | F02D 41/0055 123/568.11 |
| 2013/0226435 A1* | 8/2013 | Wasberg | ................ | F02D 21/08 701/102 |
| 2013/0312719 A1* | 11/2013 | Mikashima | ......... | F02D 41/0055 123/568.21 |
| 2013/0319382 A1* | 12/2013 | Horie | ................. | F02M 25/0737 123/568.12 |
| 2015/0198119 A1* | 7/2015 | Kuske | ................ | F02M 25/0709 60/605.2 |
| 2015/0369179 A1* | 12/2015 | Hotta | .................... | B60W 10/08 123/568.12 |
| 2016/0040629 A1* | 2/2016 | Hoki | ................... | F02D 41/0065 60/278 |

FOREIGN PATENT DOCUMENTS

| | | | | |
|---|---|---|---|---|
| JP | H04-284147 A | 10/1992 | | |
| JP | 2003-120430 A | 4/2003 | | |
| JP | 2003-239811 A | 8/2003 | | |
| JP | 2005-048723 A | 2/2005 | | |
| JP | 2006-183557 A | 7/2006 | | |
| JP | 2007-211595 A | 8/2007 | | |
| JP | 2007-278116 A | 10/2007 | | |
| JP | 2012-087636 A | 5/2012 | | |
| JP | 2012087636 A * | 5/2012 | ......... | F01M 25/0707 |
| WO | WO 2012049916 A1 * | 4/2012 | | |

* cited by examiner

EGR CONTROL VALVE FULLY-CLOSED STATE

IMMEDIATELY AFTER VALVE OPEN FROM
EGR CONTROL VALVE FULLY-CLOSED STATE

CONTROL DEVICE FOR INTERNAL COMBUSTION ENGINE

TECHNICAL FIELD

The present invention relates to a control device for an internal combustion engine that recirculates a part of exhaust gas to an upstream side of a supercharger.

BACKGROUND ART

There has been known a technique, in which an EGR passage connected to an exhaust passage and connected to an intake passage and an EGR control valve installed in the EGR passage are provided, and by performing EGR which introduces a part of exhaust gas into an intake system (an intake line) in accordance with an operating condition, exhaust performance and fuel economy of an internal combustion engine are improved.

For instance, Patent Document 1 discloses a configuration, in which an intake control valve that is disposed in an intake pipe of each cylinder located at a downstream side of a throttle valve and changes an opening area of the intake pipe by flap motion of the intake control valve together with turning motion of a shaft is provided, and an EGR gas ejection hole formed in the intake pipe of each cylinder, which is connected to an EGR passage branching off from an exhaust passage, can be closed by the intake control valve or the shaft.

In such a configuration of Patent Document 1, as long as the EGR gas ejection hole is closed by the intake control valve or the shaft, even if an EGR control valve disposed in the EGR passage is opened, EGR gas does not flow into the intake pipe. Therefore, in an operating condition in which the EGR gas is not introduced into the intake pipe, by filling the EGR passage with the EGR gas while closing the EGR gas ejection hole by the EGR control valve etc., when the operating condition is changed to an operating condition in which the EGR gas is introduced into the intake pipe, by opening the EGR gas ejection hole and opening the EGR control valve at a target opening degree, an EGR ratio can be controlled with a good response.

In the case of Patent Document 1, however, for the control of the EGR, besides the EGR control valve, a component such as the intake control valve which is capable of closing the EGR gas ejection hole is necessary, and this brings a problem of increasing a component count for the EGR control.

CITATION LIST

Patent Document

Patent Document 1: Japanese Patent Provisional Publication Tokkai No. 2007-278116

SUMMARY OF THE INVENTION

In the present invention, a control device has a supercharger disposed at an upstream side of a throttle valve; an EGR passage introducing, as EGR gas, a part of exhaust gas into an intake passage from an upstream side with respect to the supercharger; and an EGR control valve disposed in the EGR passage, and when an operating condition is in a non-EGR region except an EGR region, an opening degree of the EGR control valve is set to a predetermined infinitesimal opening degree.

According to the present invention, since the EGR passage is basically in a state in which the EGR passage is filled with the EGR gas, when the operating condition is changed from the non-EGR region to the EGR region and the EGR control valve is opened so as to gain a target EGR ratio, a desired quantity of the EGR gas is introduced into the intake passage substantially at the same time as the opening of the EGR control valve. An actual EGR ratio can thus follow the target EGR ratio with a good response.

BRIEF DESCRIPTION OF DRAWINGS

FIG. 3A shows the distribution of EGR gas in a state in which an EGR control valve is closed. FIG. 3B shows the distribution of EGR gas immediately after the EGR control valve is opened from the EGR control valve closed state.

DESCRIPTION OF EMBODIMENTS

Figure 1:
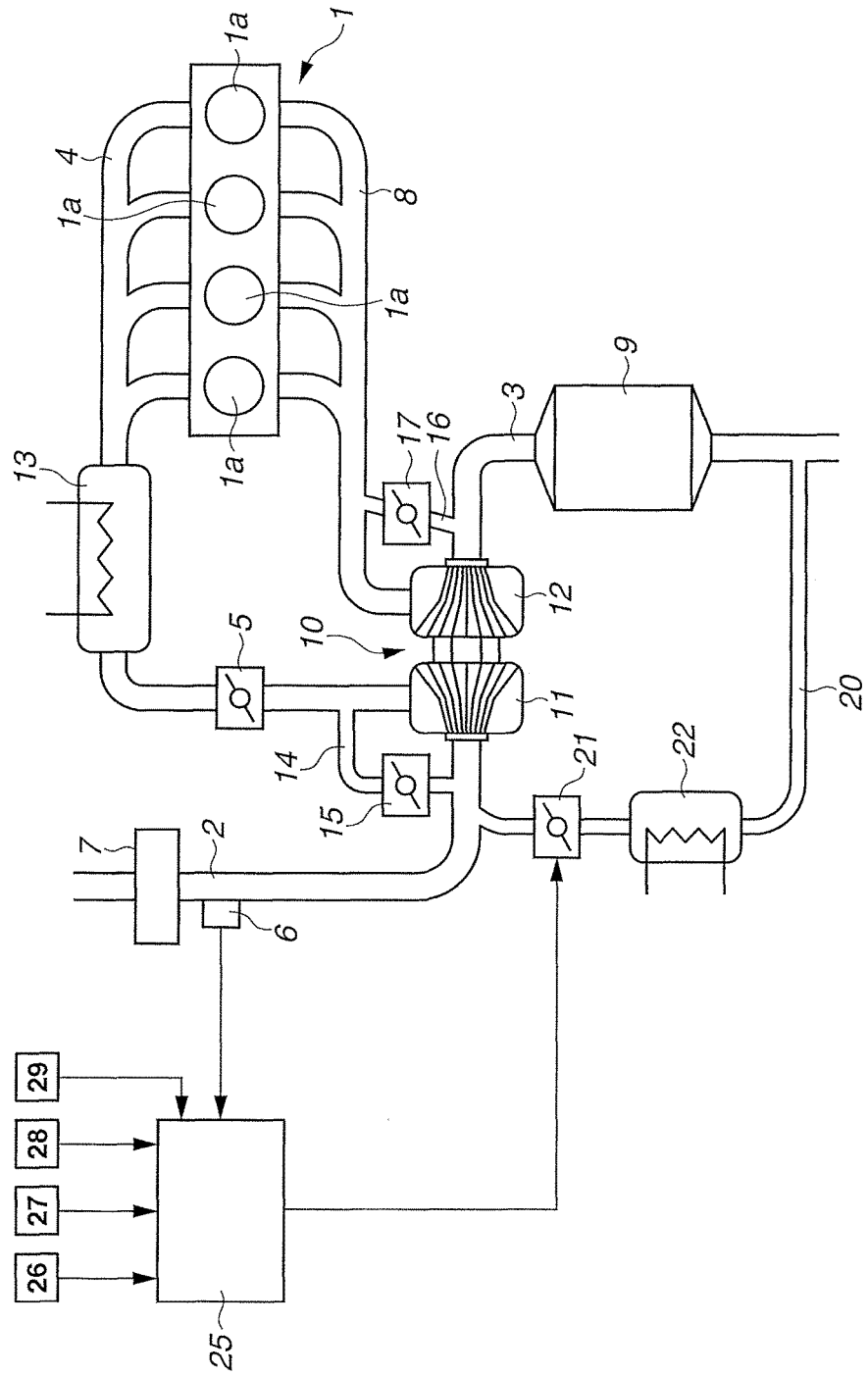
FIG. 1 is a general system block diagram of a control device of an internal combustion engine according to the present invention.

In the following description, embodiments of the present invention will be explained on the basis of the drawings. FIG. 1 is a general system block diagram of a control device of an internal combustion engine 1 to which the present invention is applied.

The internal combustion engine 1 is an engine that is mounted, as a driving source, in a vehicle such as an automobile. An intake passage 2 and an exhaust passage 3 are connected to each cylinder 1a of the internal combustion engine 1. A throttle valve 5 is provided in the intake passage 2 connecting to the internal combustion engine 1 through an intake manifold 4, also an air flow meter 6 for detecting a quantity of intake air and an air cleaner 7 are provided at an upstream side of the throttle valve 5. An exhaust catalyst 9 such as a three-way catalyst for clean-up of exhaust gas is provided in the exhaust passage 3 connecting to the internal combustion engine 1 through an exhaust manifold 8.

Further, the internal combustion engine 1 is provided with a turbocharger 10 having a compressor 11 disposed in the intake passage 2 and a turbine 12 disposed in the exhaust passage 3 with these compressor 11 and turbine 12 coaxially arranged with each other. The compressor 11 is positioned at an upstream side with respect to the throttle valve 5, and is positioned at a downstream side with respect to the air flow meter 6. The turbine 12 is positioned at an upstream side with respect to the exhaust catalyst 9. Here, a reference sign 13 in FIG. 1 is an intercooler provided at an upstream side of the throttle valve 5.

A recirculation passage 14 bypassing the compressor 11 and connecting an upstream side and a downstream side of the compressor 11 is connected to the intake passage 2. In the recirculation passage 14, an electrically controlled recirculation valve 15 that controls an intake flow amount in the recirculation passage 14 is installed.

An exhaust bypass passage 16 bypassing the turbine 12 and connecting an upstream side and a downstream side of the turbine 12 is connected to the exhaust passage 3. In the exhaust bypass passage 16, an electrically controlled waste gate valve 17 that controls an exhaust flow amount in the exhaust bypass passage 16 is installed.

The internal combustion engine 1 is an exhaust gas recirculation (EGR)—capable engine, and an EGR passage 20 is provided between the exhaust passage 3 and the intake passage 2. One end of the EGR passage 20 is connected to the exhaust passage 3 in a downstream side position of the exhaust catalyst 9, and the other end of the EGR passage 20 is connected to the intake passage 2 in an upstream side position of the compressor 11 at a downstream side of the air cleaner 7. In this EGR passage 20, an electrically controlled EGR control valve 21 and an EGR cooler 22 are installed. An opening degree of the EGR control valve 21 is controlled by a control unit 25 so as to gain a predetermined EGR ratio according to an operating condition.

The control unit 25 inputs a detection signal of the above-mentioned air flow meter 6, and also inputs detection signals of sensors such as a crank angle sensor 26 that detects a crank angle of a crankshaft (not shown), an accelerator opening degree sensor 27 that detects a depression amount of an accelerator pedal (not shown), an intake air temperature sensor 28 that detects intake air temperature and a cooling water temperature sensor 29 that detects temperature of cooling water in the internal combustion engine 1.

The control unit 25 performs controls of an ignition timing, an air-fuel ratio etc. of the internal combustion engine 1 on the basis of these detection signals. The control unit 25 also performs an exhaust gas recirculation control (an EGR control) that recirculates a part of the exhaust gas from the exhaust passage 3 to the intake passage 2 on the basis of the detection signals by controlling the opening degree of the EGR control valve 21. Further, the control unit 25 controls each opening degree of the throttle valve 5, the recirculation valve 15 and the waste gate valve 17. As the recirculation valve 15, not only the valve that is open/close controlled by the control unit 25, but also a so-called check valve that opens only when a pressure at a downstream side of the compressor 11 becomes a predetermined pressure or higher could be used.

In the configuration in which the EGR is introduced from an upstream side of the compressor 11 of the turbocharger 10, which is provided in the intake passage 2, the EGR is introduced by or according to a pressure difference between an exhaust pressure Pe in the exhaust passage 3 at a position where the EGR passage 20 is connected and an intake pressure Pi in the intake passage 2 at a position where the EGR passage 20 is connected.

Here, from a relationship based on Bernoulli's theorem, a proportional relationship is established between the quantity of the intake air and a square root of the pressure difference between the exhaust pressure Pe and the intake pressure Pi. Further, a proportional relationship is established also between the square root of the pressure difference between the exhaust pressure Pe and the intake pressure Pi and an EGR amount (an exhaust gas recirculation amount). Therefore, a proportional relationship (an EGR ratio is constant) is established also between the quantity of the intake air and the EGR amount. That is to say, in the configuration in which a part of the exhaust gas is recirculated to the intake passage 2 by using the pressure difference between the intake pressure Pi and the exhaust pressure Pe, if the opening degree (an opening area) of the EGR control valve 21 is constant, even if the quantity of the intake air changes, since a proportion of the EGR amount to the quantity of the intake air is constant, the EGR ratio is constant.

Figure 2:
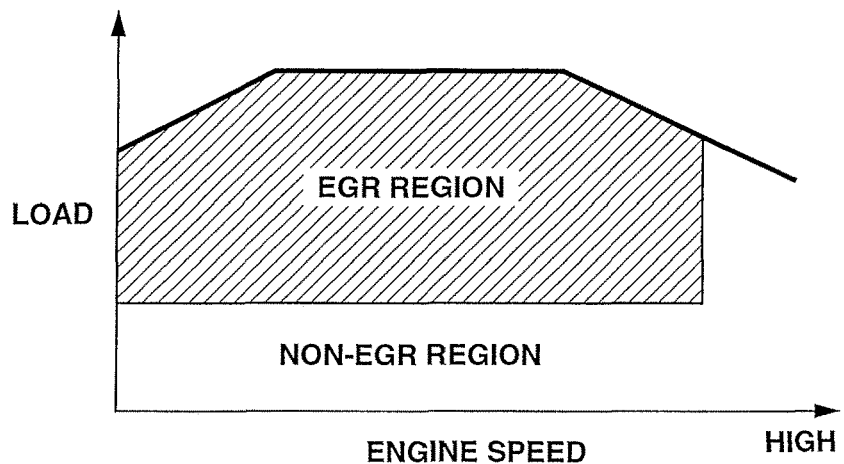
FIG. 2 is an explanatory drawing schematically showing a relationship between an EGR region, a non-EGR region and an operating condition.

The opening degree of the EGR control valve 21 is basically controlled, as shown in FIG. 2, so as to gain a target EGR ratio in an EGR region, and the EGR control valve 21 is closed in a non-EGR region. The EGR region is, for instance, a region when the internal combustion engine 1 is in a middle or heavy load state. The non-EGR region is, for instance, a region when the internal combustion engine 1 is in a light load state. In the EGR region, the opening degree of the EGR control valve 21 is controlled so as to gain the target EGR ratio. The target EGR ratio is calculated from, for instance, the load of the internal combustion engine 1 and an engine speed. The load of the internal combustion engine 1 is calculated on the basis of a detection value of the accelerator opening degree sensor 27. The engine speed is calculated on the basis of a detection value of the crank angle sensor 26.

Figure 3A:
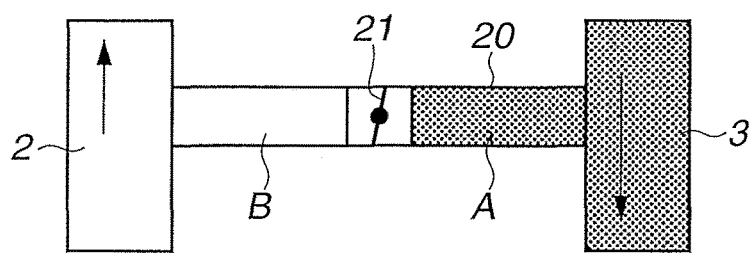
FIGS. 3A and 3B are drawings schematically showing distribution of EGR gas in an EGR passage.
Figure 3B:
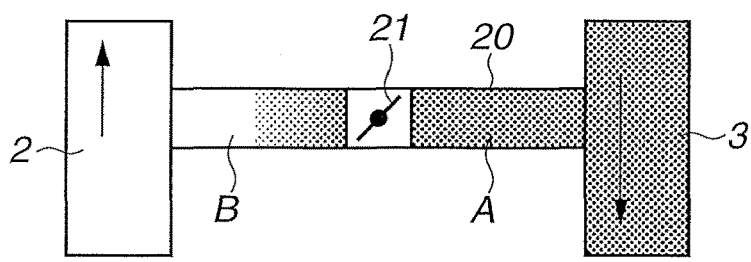

FIGS. 3A and 3B are drawings schematically showing distribution of the EGR gas in the EGR passage 20. FIG. 3A shows the distribution of the EGR gas in a state in which the EGR control valve 21 is closed (fully closed). FIG. 3B shows the distribution of the EGR gas immediately after the EGR control valve 21 is opened from the EGR control valve closed state (the EGR control valve fully-closed state). In FIGS. 3A and 3B, a direction of an arrow in the intake passage 2 indicates a flow direction of the intake air, and a direction of an arrow in the exhaust passage 3 indicates a flow direction of the exhaust air (the exhaust gas).

As shown in FIG. 3A, when the EGR control valve 21 is in the closed state, a part A positioned at the exhaust passage 3 side with respect to the EGR control valve 21 in the EGR passage 20 is filled with the EGR gas (the exhaust gas), and a part B positioned at the intake passage 2 side with respect to the EGR control valve 21 in the EGR passage 20 is filled with fresh air. Thus, immediately after opening the EGR control valve 21, the fresh air in the part B is pushed out to the intake passage 2 by the EGR gas. Because of this, the EGR amount according to the opening degree of the EGR control valve 21 is not introduced into the intake passage 2 until the part B is filled with the EGR gas, an actual EGR ratio thus deviates from the target EGR ratio.

Therefore, in the present embodiment, in the non-EGR region that is a light load operating region, the EGR control valve 21 is opened at a predetermined infinitesimal opening degree M that corresponds to such infinitesimal EGR ratio (for example, EGR ratio is 1% or less) as not to affect the ignition timing. That is, in the non-EGR region, the EGR control valve 21 is opened at the predetermined infinitesimal opening degree M so that a quantity of the EGR gas, by which the combustion is unaffected, flows. Here, unlike the present embodiment, in a case of a configuration in which the EGR gas is introduced into the intake passage from a downstream side with respect to the throttle valve as disclosed in the above Patent Document 1, the smaller the throttle opening degree, the greater the negative pressure at a joining point between the EGR passage and the intake passage. Because of this, even if the opening degree of the EGR control valve is set to the predetermined infinitesimal opening degree, it is not possible to keep the EGR ratio at the infinitesimal EGR ratio according to this infinitesimal opening degree.

In such a present embodiment, the EGR passage 20 is basically in a state in which the EGR passage 20 is filled with the EGR gas all the time. Consequently, the quantity of the EGR gas according to the opening degree of the EGR control valve 21 is introduced into the intake passage 2 from a time point immediately after the operating condition is changed from the non-EGR region to the EGR region that is a middle or heavy load operating region. The actual EGR ratio can thus follow the target EGR ratio with a good response.

However, in a case where a fuel-cut control that stops fuel supply to the internal combustion engine 1 is executed, in a case where the intake air temperature is a predetermined temperature or less, in a case where the cooling water temperature in the internal combustion engine is a predetermined temperature or less, and in a case where the quantity of the intake air is a predetermined quantity or less, even if the operating condition is in the non-EGR region that is the light load operating region, the EGR control valve 21 is not opened at the predetermined infinitesimal opening degree M, but is closed (fully closed).

During the execution of the fuel-cut control, since an exhaust system (an exhaust line) is filled with the fresh air, by closing the EGR control valve 21, it is possible to prevent the fresh air from being recirculated through the EGR passage 20.

Further, if the intake air temperature and/or the cooling water temperature are low, there is a possibility that moisture (or water) in the EGR gas will condense, then this leads to a risk of fixation or sticking of the throttle valve 5 due to solidification of the moisture (or the water) in the liquefied EGR gas, or a risk that the EGR gas dissolves in the moisture (or the water) of the liquefied EGR gas, which produces the acid, and a component in an intake system (an intake line) such as the throttle valve 5 and the compressor 11 of the turbocharger 10 located at a downstream side with respect to the EGR control valve 21 will corrode. For this reason, even if the operating condition is in the non-EGR region, in the case where the intake air temperature and/or the cooling water temperature are low, by closing the EGR control valve 21, the valve fixation (or the valve sticking) caused by the condensation of the moisture (or the water) in the EGR gas and the corrosion of the component in the intake line are avoided.

Then, after the fuel-cut control is ended, if the EGR control valve 21 is opened before the exhaust passage 3 from the cylinder 1a up to a joining point between the EGR passage 20 and the exhaust passage 3 is filled with the exhaust gas, the fresh air in the exhaust passage 3 is introduced into the intake passage 2.

Therefore, even if the fuel-cut control is ended, the EGR control valve 21 is brought into a valve closed state until the exhaust passage 3 from the cylinder 1a up to the joining point between the EGR passage 20 and the exhaust passage 3 is filled with the exhaust gas. That is, by holding the valve closed state of the EGR control valve 21 until a predetermined time elapses from the end of the fuel-cut control, the recirculation of the fresh air through the EGR passage 20 is prevented. Here, the predetermined time is calculated on the basis of, for instance, a volume of the exhaust passage 3 from the cylinder 1a up to the joining point between the EGR passage 20 and the exhaust passage 3 and the operating condition (the engine speed and/or the quantity of the intake air) of the internal combustion engine 1 after the end of the fuel-cut control. As an easy way of determining the predetermined time, as the operating condition of the internal combustion engine 1 after the end of the fuel-cut control, an operating condition in which the exhaust gas flow amount becomes the minimum is assumed (or estimated), and a time (an estimated longest time) required for the above volume to be filled with the exhaust gas at the minimum exhaust gas flow amount is previously calculated, then this calculated time could be used for the predetermined time as a fixed value. Here, the fuel-cut control is established, for instance, when the accelerator opening degree is a predetermined opening degree or less, the engine speed is a predetermined speed or greater and a vehicle speed is a predetermined speed or higher.

Even if the fuel-cut control is ended and the exhaust passage 3 up to the joining point between the EGR passage 20 and the exhaust passage 3 is filled with the exhaust gas then the operating condition is in the EGR region, if the opening degree of the EGR control valve 21 is controlled so as to gain the target EGR ratio before the EGR passage 20 is filled with the EGR gas, the fresh air in the EGR passage 20 is introduced into the intake passage 2, the actual EGR ratio thus deviates from the target EGR ratio.

Therefore, after the end of the fuel-cut control, even if the operating condition is in the EGR region, by holding the opening degree of the EGR control valve 21 at the predetermined infinitesimal opening degree M until the EGR passage 20 is filled with the EGR gas (the exhaust gas), the deviation of the actual EGR ratio from the target EGR ratio is prevented in the EGR region.

Here, a timing at which the EGR passage 20 is filled with the EGR gas after the end of the fuel-cut control is a timing at which a predetermined time required for the exhaust passage 3 from the cylinder 1a up to the joining point between the EGR passage 20 and the exhaust passage 3 to be filled with the exhaust gas after the end of the fuel-cut control elapses and also after a lapse of the predetermined time an EGR passage filling time required for the EGR passage 20 to be filled with the EGR gas (the exhaust gas) elapses. The EGR passage filling time is calculated by, for instance, a volume of the EGR passage 20 and the operating condition (the engine speed and/or the quantity of the intake air) of the internal combustion engine 1 after opening the EGR control valve 21 at the predetermined infinitesimal opening degree M. As an easy way of determining the EGR passage filling time, a longest filling time is previously calculated from a minimum EGR amount when the opening degree of the EGR control valve 21 is set to the infinitesimal opening degree M and the volume of the EGR passage 20, then this calculated time could be used for the EGR passage filling time as a fixed value.

Further, in the configuration, like the present embodiment, in which the EGR is introduced from the upstream side of the compressor 11 of the turbocharger 10, which is provided in the intake passage 2, if a certain intake air quantity or more is not present, a front-to-back pressure difference of the EGR control valve 21 is relatively small by an influence of a pressure loss of the EGR passage 20, then even when the EGR control valve 21 is opened, the EGR gas is not recirculated. Therefore, in a case where, even if the operating condition is in the non-EGR region, the quantity of the intake air is the predetermined quantity or less, for instance, in a low rotation speed light load operating region like idle operation, the EGR control valve 21 is closed, thereby saving power consumption when opening the EGR control valve 21.

Figure 4:
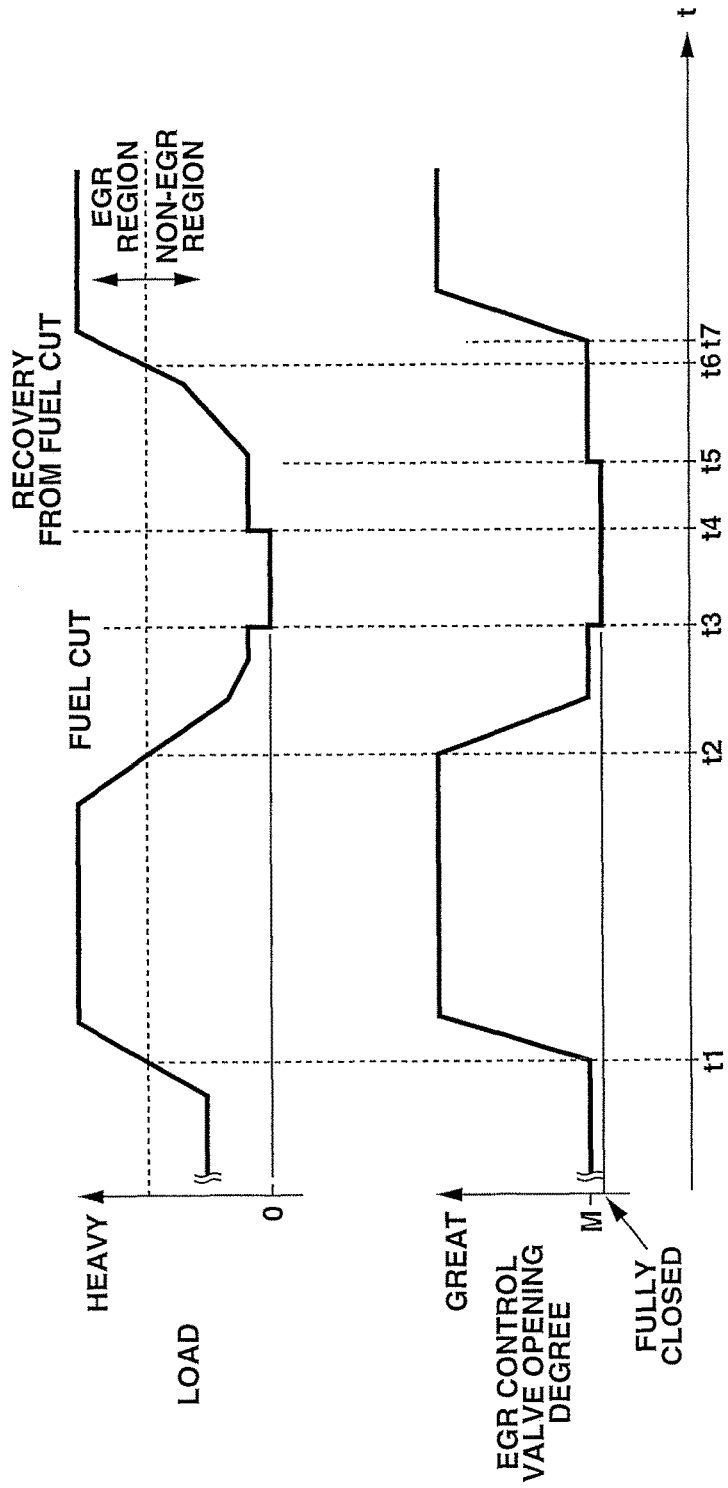
FIG. 4 is a timing chart showing an example of control of the EGR control valve.

FIG. 4 is a timing chart showing an example of the control of the EGR control valve 21 in the present embodiment.

At time t1, when the load of the internal combustion engine 1 becomes greater and the operating condition is changed from the non-EGR region to the EGR region, the opening degree of the EGR control valve 21 increases from the predetermined infinitesimal opening degree M to an opening degree according to the target EGR ratio. At time t2, when the load of the internal combustion engine 1 becomes smaller and the operating condition is changed from the EGR region to the non-EGR region, the EGR control valve 21 is closed up to the predetermined infinitesimal opening degree M. Then, at time t3, when the fuel-cut control is started, the EGR control valve 21 is controlled to be in the valve closed state. Although the fuel-cut control is ended (recovery from the fuel-cut) at time t4, the EGR control valve 21 is held at the valve closed state until time t5 at which the exhaust passage 3 up to the joining point between the EGR passage 20 and the exhaust passage 3 is filled with the exhaust gas, then the EGR control valve 21 is opened at the predetermined infinitesimal opening degree M from time t5. At time t6, although the load of the internal combustion engine 1 becomes greater and the operating condition is changed from the non-EGR region to the EGR region, the opening degree of the EGR control valve 21 is held at the predetermined infinitesimal opening degree M until time t7 at which the whole of the EGR passage 20 is filled with the exhaust gas.

The invention claimed is:

1. An internal combustion engine system comprising:
   a supercharger disposed upstream of a throttle valve in an intake passage;
   an EGR passage introducing exhaust gas into the intake passage upstream of the supercharger;
   an EGR control valve disposed in the EGR passage; and
   a control device configured to:
   control an opening degree of the EGR control valve to gain a target EGR ratio when an operating condition of an internet combustion engine is in an EGR region;
   adjust the EGR control valve to a predetermined infinitesimal opening degree when the operating condition of the internal combustion engine is in a non-EGR region to fill the EGR passage with exhaust gas,
   stop a fuel supply to the internal combustion engine in the non-EGR region when a predetermined condition is satisfied,
   close the EGR control valve white the fuel supply to the internal combustion engine in the non-EGR region is stopped, and
   open and hold the EGR control valve at the predetermined infinitesimal opening degree until the EGR passage is filled with the exhaust gas when the fuel supply is resumed from the stoppage of the fuel supply.

2. The internal combustion engine system as claimed in claim 1, wherein:
   the control unit is further configured to:
   hold the EGR control valve closed when the fuel supply to the internal combustion engine resumes until an exhaust passage from a cylinder of the internal combustion engine up to a joining point between the EGR passage and the exhaust passage is filled with the exhaust gas.

3. The internal combustion engine system as claimed in claim 1, further comprising:
   an intake air temperature sensor that detects intake air temperature, and wherein
   the control unit to further configured to:
   close the EGR control valve when the intake air temperature is a predetermined temperature or less in the non-EGR region.

4. The internal combustion engine system as claimed in claim 1, further comprising:
   a cooling water temperature sensor that detects temperature of cooling water, and wherein
   the control unit is further configured to:
   close the EGR control valve when the cooling water temperature is a predetermined temperature or less in the non-EGR region.

5. The internal combustion engine system as claimed in claim 1, wherein:
   the control unit is further configured to:
   close the EGR control valve in an operating region in which a quantity of intake air is a predetermined quantity or less in the non-EGR region.

* * * * *